July 28, 1959     E. ABRAHAM     2,896,596
DOUBLE PISTON INTERNAL COMBUSTION ENGINE
Filed June 21, 1957     4 Sheets-Sheet 1
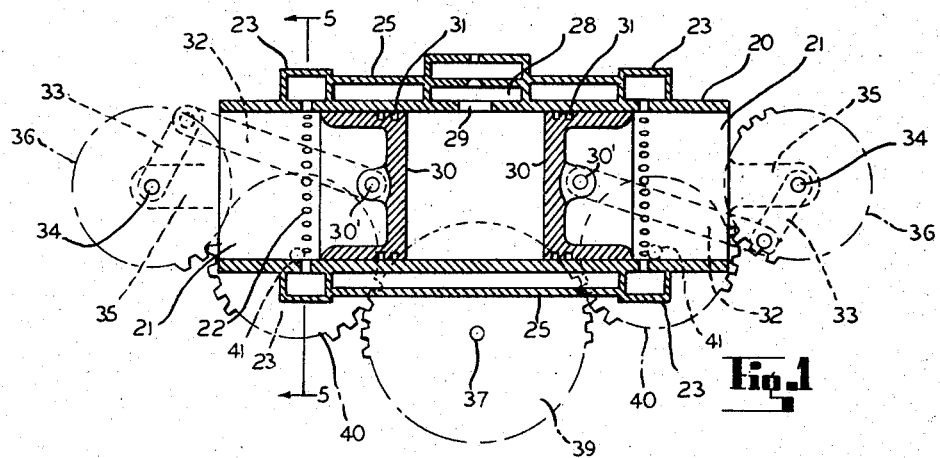
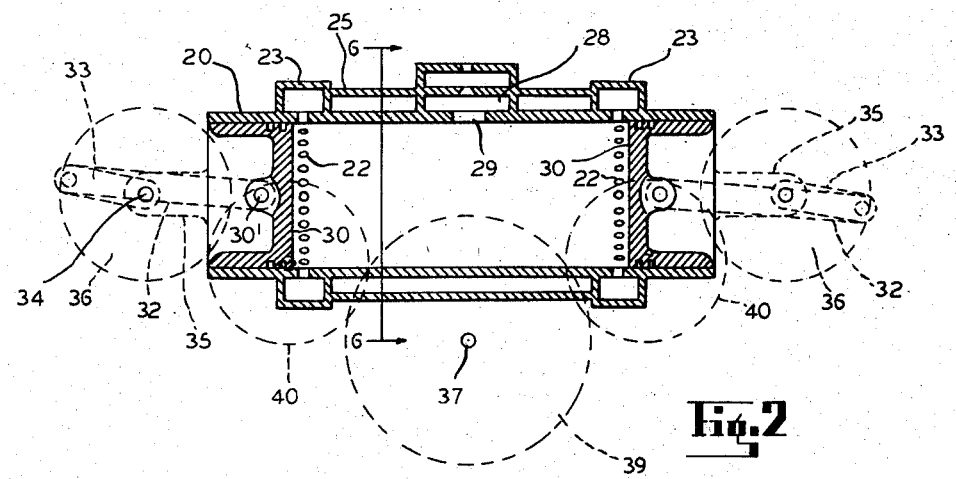
INVENTOR.
ERICH ABRAHAM
BY
PARKER & CARTER
ATTORNEYS July 28, 1959

E. ABRAHAM 2,896,596

DOUBLE PISTON INTERNAL COMBUSTION ENGINE

Filed June 21, 1957

INVENTOR.
ERICH ABRAHAM
BY
PARKER & CARTER
ATTORNEYS

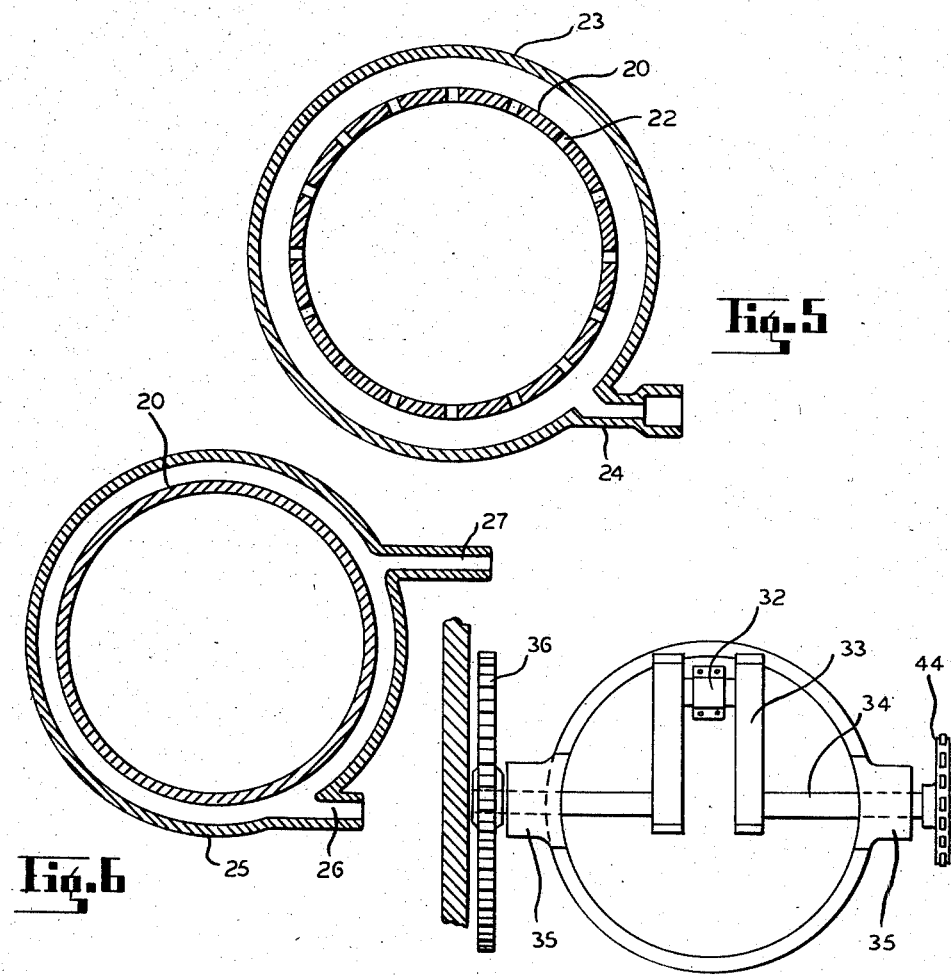
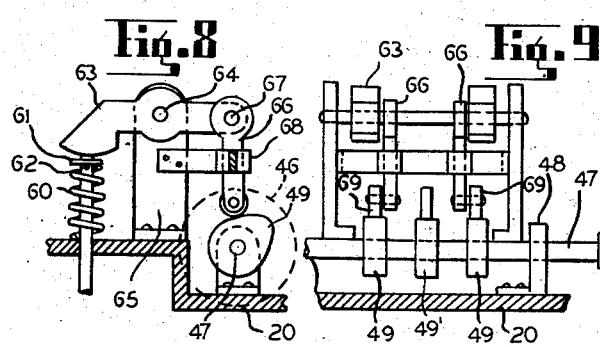

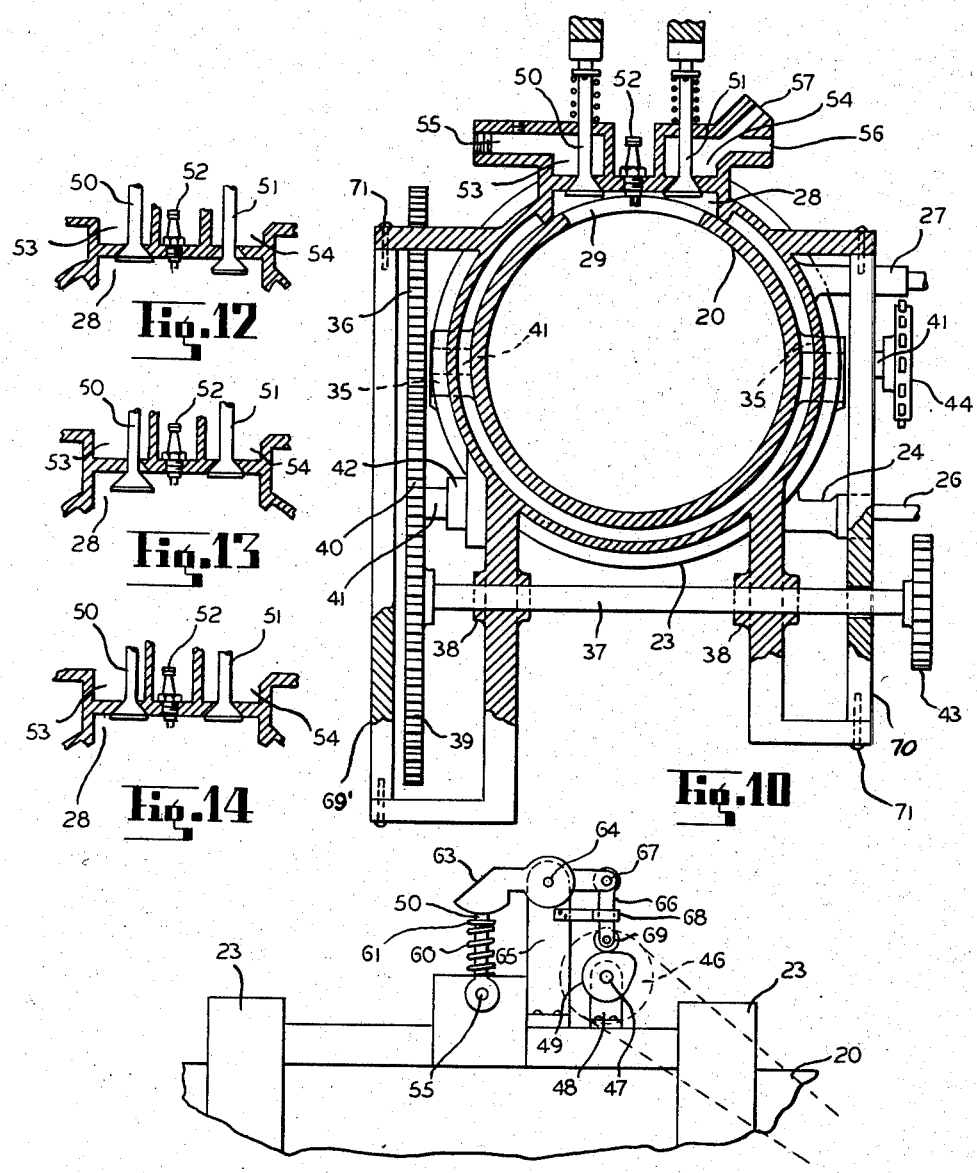

United States Patent Office 2,896,596
Patented July 28, 1959

2,896,596

DOUBLE PISTON INTERNAL COMBUSTION ENGINE

Erich Abraham, Milwaukee, Wis.

Application June 21, 1957, Serial No. 667,139

2 Claims. (Cl. 123—51)

My invention relates to internal combustion engines, and more particularly to a type of four cycle, four stroke engine equipped with oppositely disposed pistons, and having liquid hydrocarbon fuel injected directly into the combustion chamber.

The prime object of my invention is to provide a simple, four cycle internal combustion engine that is economical to construct, yet produces more power with less fuel consumption.

Another object of my invention is to provide an engine of the character described with improved scavenging and fuel intake arrangement.

Another object is to equip both cylinders or only one cylinder with auxiliary exhaust ports to provide a speedy and complete scavenging of the exhaust gases.

A further object is to provide an engine of the character described, employing a gear train arrangement to equalize the piston travel and power stroke.

Still another object is to provide an engine having a plurality of gears arranged in a manner, so they may be changed to alter the speed of the driven shaft, and thereby effect the pull, load, and efficiency of the engine.

Other and further objects of my invention will become more apparent as the description proceeds, when taken in conjunction with the drawings, in which:

Figure 1 is a longitudinal cross sectional view of the entire unit, with the exhaust stroke over half completed, and the compression stroke half completed;

Figure 2 is a view similar to that shown in Figure 1, but with the power stroke completed and the exhaust stroke started at the beginning of the compression;

Figure 5 is a lateral cross section of the device taken at the line 5—5 of Figure 1, showing the auxiliary exhaust ports;

Figure 6 is a lateral cross section taken at the line 6—6 of Figure 2, showing the water jacket arrangement;

Figure 7 is an end view of the assembled device, taken at the line 7—7 of Figure 4;

Figure 8 is a side view illustrating the tappet arrangement for operating the valves by means of cams;

Figure 9 is a front view of the cam shaft and tappet arrangement shown in Figure 8;

Figure 10 is a cross sectional view of the assembled device taken at the line 10—10 of Figure 4;

Figure 11 is a side view of a fragmentary portion of the top of the device, showing the valve actuating means;

Figure 12 is a fragmentary cross section of the valve positions when the pistons are in the position shown in Figure 4;

Figure 13 is a view similar to that shown in Figure 12, with the valves in position when the pistons are as shown in Figure 2; and Figure 14 is still another view showing the position of the valves when the pistons are in position as shown in Figures 1 and 3.

Figure 3:
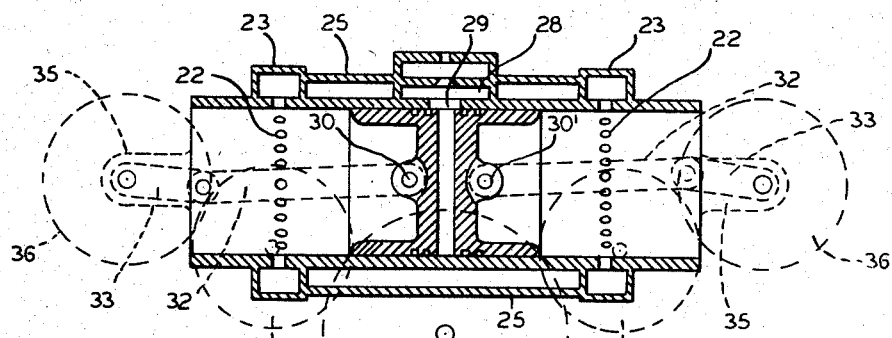
Figure 3 is a view similar to that shown in Figures 1 and 2, but with the power stroke started and the compression completed.

Similar characters of reference indicate corresponding parts throughout the several views and referring now to the same, the character 20 shows a cylinder, open at both ends 21, and provided with a plurality of auxiliary exhaust ports 22, for quick scavenging. These ports encircle the cylinder wall near both ends and are spaced apart from one another. The ports 22 are covered by circular manifolds 23, equipped with outlet tubes 24, as shown in Figures 5 and 10.

A water jacket 25 encircles the cylinder 20 between the manifolds 23. This water jacket acts as a cooling means when water is circulated therein by means of the inlet tube 26 and the outlet tube 27, as shown in cross section in Figure 6.

A combustion chamber 28 is disposed at the top of the cylinder 20 at its central portion, and an opening 29 affords communication between the inside of the cylinder 20 and the chamber 28. This arrangement will be described more in detail in the following description.

Within the cylinder 20 are shown a pair of pistons 30, oppositely disposed with their faces opposing one another. These pistons are provided with any number of conventional piston rings 31, and have pins 30' extending laterally across the pistons to accommodate connecting rods 32, rotatably journaled thereon at one end, and having their other end rotatably supported on cranks 33 extending from the crank shafts 34, journaled on both ends in bearings 35 extending outward from the ends of the wall of the cylinder 20.

A gear train connects the two crank shafts 34. A spur gear 36 is attached to one end of each of the crank shafts 34 caused to revolve by the movement of the pistons 30, joined to the crank shafts 34 by the connecting rods 32. There is also a drive shaft 37 journaled in bearings 38, forming an integral part of the cylinder 20. This drive shaft 37 is equipped with a spur gear 39, and a pair of intermediate gears 40, contact and mesh with both the gears 36 and the gear 39. When the gears 36 are revolved by the crank shafts 34, it will cause the gear 39 to revolve, and through it the drive shaft 37. The intermediate gears 40 are mounted on stub shafts 41 which are journaled in bearings 42, formed integral with the cylinder 20.

The gears 40 may be adjustably mounted in any conventional manner (not shown), thereby permitting the use of gears of varied diameters, and by changing the diameters of the gear 39 and the gears 36 and 40, different speed ratios of the drive shaft 37 may be obtained.

A spur gear 43, as shown in Figure 10, is attached to the open end of the drive shaft 37, and is employed to act as a driving means for any unit to be driven by the engine.

Figure 4:
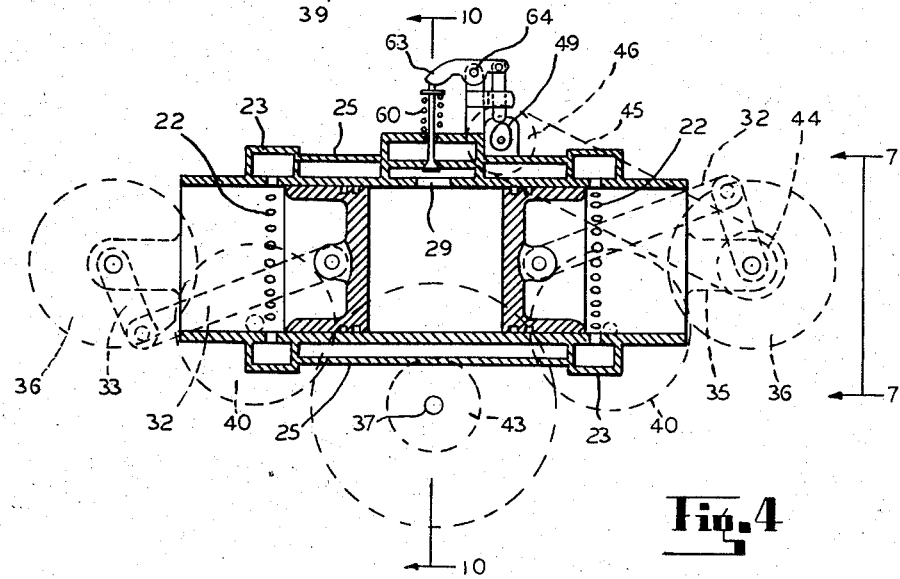
Figure 4 is still another view similar to those shown in Figures 1, 2 and 3, but showing the pistons in position when the inlet valve is open and the fuel intake takes place.

In Figures 7 and 10, I also show a sprocket 44 attached to the end of one of the crank shafts 34. This sprocket 44 is connected by means of a chain 45, as shown in Figure 4, to a sprocket 46, mounted as shown in Figure 9, on a horizontally disposed shaft 47, journaled in a pair of bearings 48, which bearings are mounted on the cylinder 20, at its upper face.

The shaft 47 supports a series of cams 49. It is manifest to anyone familiar with internal combustion engines, that the combustible gas intake and the combustible gas exhaust may be controlled as usual by valves. In the instant embodiment of the invention, an exhaust valve 50 and an intake valve 51 are mounted as shown in Figure 10, with the upper wall of the combustion chamber 28. A spark plug 52 is located between the exhaust chamber 53 and the intake chamber 54, there being an outlet 55 extending from the exhaust chamber 53. The intake chamber 54 has an air inlet 56, and a fuel injection tube 57 communicating therewith directed toward the intake valve 51.

Fuel is injected under pressure through the injection tube 57, controlled by a suitable cam on cam shaft 47.

The valves 50 and 51 have their upwardly projecting stems surrounded by resilient springs 60, disposed below a washer 61 engaging the stems of the valves, and held in position by pins 62.

These valves 50 and 51 are actuated by means of rocker arms 63 pivotally mounted at 64 on vertical standards 65. The outwardly extending ends of the rocker arms 63 pivotally engage link members 66 at 67, and the link members 66 are guided by means of the members 68 attached to the vertical supports 65. The lower ends of the links 66 are shown equipped with rollers 69 for engagement with the cams 49 attached to the cam shaft 47, which shaft is caused to revolve by means of the chain 45 over the sprockets 44 and 46 respectively.

The side plates shown as 69' and 70, are attached by means of screws 71, or in any other convenient manner, and are employed to act as enclosures for the gears or the like.

The positions of the valves 50 and 51 are changed by the rocker arms 63 operated by the cams on the cam shaft 47, and take the position shown in Figures 12, 13 and 14. In Figure 12 the exhaust valve 50 is closed and the inlet valve 51 is open, governed by the piston stroke as shown in Figure 4, while in Figure 13 the opposite is true, as when the pistons are in the position shown in Figure 2, and in Figure 14, both valves 50 and 51 are shown closed to conform with the position of the pistons as shown in Figures 1 and 3.

It will be noted that at the end of the power stroke, as shown in Figure 2, the exhaust port holes 22 at each end of the cylinder are open, as well as the exhaust valve, as shown in Figure 13, to cause rapid escape of exhaust gases. The remaining portion of the exhaust gases escape through the exhaust valve during the succeeding exhaust stroke. Also, at the end of the intake stroke following the position of the pistons shown in Figure 4, the exhaust ports 22 are opened at the end of said intake stroke, while the intake valve remains open and fresh air is admitted through the inlet valve to further scavenge exhaust gases through the open ports 22. Upon succeeding inward movement of the pistons on the compression stroke, the ports 22 are closed, whereupon fuel is immediately injected under pressure through injection tube 57 and inlet valve 51. The injection is timed to stop before the intake valve is closed, and the intake valve closes some time before the compression stroke is finished. Inlet valve 51 is closed after fuel injection occurs and before the compression stroke has advanced sufficiently to create a pressure exceeding the pressure in the inlet passage, thus assuring combustion only in the cylinder of the engine.

From the above description it will be clear that the simple construction shown provides an efficient, inexpensive internal combustion engine of the four-stroke, four-cycle type.

Although I have shown a specific arrangement of the component parts constituting my device, it will be understood that many changes may be made in the form and configuration of the component parts, without affecting their efficiency, the spirit of my invention, or the scope of the appended claims.

I claim:

1. In a four stroke internal combustion engine comprising a cylinder, two pistons reciprocally mounted in opposite ends of said cylinder, said cylinder being provided with a plurality of auxiliary spaced exhaust ports extending around the periphery of each end of said cylinder, said auxiliary exhaust ports being uncovered by said pistons at the outer end of their strokes, crank shafts arranged at opposite ends of said cylinder interconnected with each other by gearing to move said pistons toward and away from each other, a combustion chamber mounted on and communicating with said cylinder midway of its ends, intake and exhaust passages communicating with said chamber, fuel injection means mounted within said intake passage, an intake valve mounted in said chamber for controlling the admittance of air and fuel from said fuel injection means through said intake passage and into said chamber, and an exhaust valve mounted within said chamber for controlling said exhaust passage, said intake and exhaust valves being connected to said gearing to open and close in timed relation with said pistons, said fuel injection means being connected with said gearing to open and close in timed relation with said pistons, said exhaust valve being timed to open before the exhaust stroke begins, said inlet valve being timed to open before the exhaust stroke is finished for the admission of air to said cylinder and also being timed to remain open after said pistons have closed said auxiliary exhaust ports at the beginning of a compression stroke and to close before said pistons have completed the compression stroke, said fuel injection means being actuated only when said intake valve is open during the compression stroke, said exhaust valve and said auxiliary exhaust ports scavenging said cylinder and cooling said cylinder, said combustion chamber, said intake and exhaust valves and said auxiliary exhaust ports twice during each cycle of operation.

2. In a four stroke internal combustion engine comprising a cylinder, two pistons reciprocally mounted in opposite ends of said cylinder, said cylinder being provided with a plurality of auxiliary spaced exhaust ports extending around the periphery of each end of said cylinder, said auxiliary exhaust ports being uncovered by said pistons at the outer end of their strokes, crank shafts arranged at opposite ends of said cylinder interconnected with each other by gearing to move said pistons toward and away from each other, intake and exhaust passages communicating with said cylinder midway of its ends, fuel injection means mounted within said intake passage, an intake valve mounted on said cylinder for controlling the admittance of air and fuel from said fuel injection means through said intake passage and into said cylinder, and an exhaust valve mounted on said cylinder for controlling said exhaust passage, said intake and exhaust valves being connected to said gearing to open and close in timed relation with said pistons, said fuel injection means being connected with said gearing to open and close in timed relation with said pistons, said exhaust valve being timed to open before the exhaust stroke begins and close before the suction stroke begins, said inlet valve being timed to open before the exhaust stroke for the admission of air to said cylinder, and also being timed to remain open after said pistons have closed said auxiliary exhaust ports at the beginning of a compression stroke and to close before said pistons have completed the compression stroke, said fuel injection means being actuated only when said intake valve is open during the compression stroke, said exhaust valve and said auxiliary exhaust ports scavenging said cylinder and cooling said cylinder, said intake and exhaust valves and said auxiliary exhaust ports twice during each cycle of operation.

References Cited in the file of this patent

UNITED STATES PATENTS

| | | |
|---|---|---|
| 670,966 | Pender | Apr. 2, 1901 |
| 1,324,520 | Robbins | Dec. 9, 1919 |
| 1,389,873 | Hult | Sept. 6, 1921 |
| 1,839,420 | Setz | Jan. 5, 1932 |
| 2,392,060 | Osborn | Jan. 1, 1946 |
| 2,522,456 | Mallory | Sept. 12, 1950 |